3,421,879
METHOD FOR PREPARING A
SLURRY FERTILIZER
Andrew B. Funk, Memphis, Tenn., and Casimer C. Legal, Jr., and Alvin Richmond, Baltimore, Md., assignors to W. R. Grace & Co., New York, N.Y., a corporation of Connecticut
No Drawing. Filed Oct. 7, 1965, Ser. No. 493,929
U.S. Cl. 71—64  6 Claims
Int. Cl. C05b 11/16

ABSTRACT OF THE DISCLOSURE

A method for preparing a slurry fertilizer which may be stored in a substantially static state for prolonged periods of time as a colloidal gel. The gel is refluidized at the end of the storage period for distribution of the fertilizer. The method comprises acidulating phosphate rock to a citrate soluble phosphate level of at least 85 percent and ammoniating the acidulate to a colloidal susceptible pH range between 6.5 and 7.5. The slurry is next agitated to gelation. At the end of the storage time the gelled mass is refluidized by introducing anhydrous ammonia into the gelled mass until the mass returns to a liquid slurry consistency.

---

This invention is directed to slurry fertilizers and is particularly applicable to the storage of slurry fertilizers as colloidal gels and to the refluidizing of slurry fertilizers that have assumed the consistency of an unpumpable gel.

Applicants' assignee is involved in the commercial production of slurry fertilizers in accordance with the teachings of a copending United States patent application entitled Process and Product invented by Casimer C. Legal, Jr., Alvin Richmond, and Anthony J. Bruno, Jr., disclosure No. 1601, U.S. Ser. No. 605,594, filed in the U.S. Patent Office on Dec. 29, 1966, and assigned to the same assignee as this application. Since the production of these slurry fertilizers was undertaken problems have arisen from time to time with their storage.

One problem has been a precipitation and sedimentation problem. While such slurry fertilizers are resistant to precipitation and sedimentation some precipitation and sedimentation has all the same occurred during their storage. This has necessitated providing agitators in the slurry storage tanks to prevent sedimentation or to redisperse the sediment that did form.

Another storage problem that has been encountered occasionally is a problem with the slurries setting up as colloidal gels during storage. These gels were unpumpable and it was necessary to continuously agitate these slurries during storage to prevent their setting up. When the slurries did set-up as colloidal gels on occasion they were refluidized by strong agiation or air sparging. These means of dealing with the storage problems have not proven to be as satisfactory as might be desired, although they have been workable.

An object of this invention is to provide a slurry fertilizer product which may be stored in a substantially static state for a prolonged period of time as a colloidal gel and then refluidized at the end of the storage period.

Another object of this invention is to provide a process for refluidizing a slurry that has become viscous and unpumpable.

Still another object of this invention is to provide an intermediate slurry product that is a colloidal gel.

A still further object of this invention is to provide a method of storing slurry fertilizers that will yield a slurry fertilizer at the end of the storage period having relatively unchanged slurry properties when compared to the properties of the slurry when it was placed in storage.

In summary, in one embodiment of one aspect of the invention, a colloidal gel fertilizer product is provided having a density of about 1.3, being about 10 to 50% water and being sufficiently viscous to prevent the settling of siliceous particles larger than those that would pass a U.S. Standard 100 mesh screen when the fertilizer is allowed to stand in quiescent storage for a period of one month. A small quantity of sand is usually introduced into the slurry fertilizer as an impurity in the phosphate rock.

By another aspect of the invention, in one embodiment, a method of preparing a slurry fertilizer is provided wherein phosphate rock is acidulated to a citrate soluble phosphate level of at least 85% of the total phosphate, the acidulate is ammoniated to a colloidal susceptible range and in certain instances to a pH between about 6.5 and 7.5. Then the slurry is placed in storage and agitated to gelation.

By a further aspect of this invention, in one embodiment, a gelled fertilizer having a colloidal susceptible pH range is refluidized by introducing anhydrous ammonia into the fertilizer to change the pH of the fertilizer to a pH outside of the colloidal susceptible range and in certain instances raising the pH to about 7.5–8.5.

Further aspects of the present invention will become apparent hereinafter and the specification concludes with claims particularly pointing out and distinctly claiming the subject matter which we regard as our invention. The invention, however, as to organization and method of operation, together with other objects and advantages thereof, may best be understood by reference to the following description.

The following abbreviations are used in this application. 6-12-12 which is the N-P-K analysis of a fertilizer expressed as the ratio in weight equivalents of $$N-P_2O_5-K_2O$$

values of Nitrogen-Phosphorus-Potash. While phosphorus is expressed as $P_2O_5$ and potash as $K_2O$ the elements may actually be present in other chemical forms. TPA=Total Phosphoric Acid (as $P_2O_5$); CI=Citrate Insoluble Phosphorus (as $P_2O_5$); APA=Available Phosphoric Acid (as $P_2O_5$); and WSPA=Water Soluble Phosphoric Acid (as $P_2O_5$). Ammoniation is used in its broadest sense and includes the introduction of ammonium ions as salts or in any other form. By colloidal susceptible range is meant that pH range at which a slurry fertilizer will change from a fluid slurry character to a colloidal gel.

Slurry fertilizers made in accordance with the teachings of the previously mentioned copending application set up in several different storage tanks at about the same time. The storage tanks are listed as follows:

| Storage Tank | Grade | Depth of Slurry in Storage Tank (in feet) | Quantity (tons) |
|---|---|---|---|
| A | 6-12-12 | 11 | 55 |
| B | 7-14-7 | 7 | 35 |
| C | 7-14-7 | 4.5 | 22.5 |
| D | 7-14-7 | 4.5 | 22.5 |
| E | 6-12-12 | 11 | 55 |

In the past, when slurry fertilizer tended to set up agitators or air sparging had been successfully used to refluidize them. This time, however, these methods did not provide completely successful.

After a great deal of unsuccessful effort by the field crews to refluidize the slurry in the storage tanks the inventors instructed the field crews to bubble anhydrous ammonia into the thickened masses in the storage tanks. This was done by bubbling anhydrous ammonia into the fertilizer in the storage tanks through a ¾-inch pipe connected to an ammonia nurse tank. As the pH rose above 8 the entire tank of fertilizer refluidized almost instantaneously. This refluidizing was found to have occurred at a pH of about 8.5. At the pH of 8.5 the thick, immobile mass became, almost instantaneously, a thin, water-like product with excellent surface movement.

The ammonia was bubbled into the viscous mass in each tank at only a single point and the fertilizer refluidized throughout at substantially the same time indicating that the ammonia dispersed throughout the mass while it was a colloidal gel. This technique of ammoniation was subsequently tried on the other problem storage tanks and it proved to be equally successful in refluidizing them.

The storage tanks had a considerable quantity of precipitate or sediment in them. The sediment probably formed as a result of inadequate agitation prior to and during the gelling phase. This sediment showed little decrease when the fertilizer refluidized, the amonniation apparently effected only the heavy, mud-like suspension. This sediment was probably a combination of silica particles and salts of potassium bound together with calcium phosphates. Such sediments are usually hard but they resuspend when broken loose into an agitated liquid. To redisperse the precipitate it was necessary to agitate the slurry in the storage tanks for a lengthy time.

Generally when a slurry fertilizer is sufficiently fluid to be pumpable it is also sufficiently thin to allow many heavy particles to settle out if it remains in quiescent storage for a long period of time. If the slurry is changed to a viscous colloidal gel while the heavy particles are thoroughly dispersed, the stiff gel will hold the particles against precipitation. Furthermore the gel will prevent or at least substantially reduce agglomeration of material in the slurry into heavy particles. Thus if a slurry is converted to a stiff colloidal gel it remains in a substantially static condition so far as has been observed. Thus it is desirable to store slurry fertilizer as a colloidal gel and then refluidize the gel to obtain a slurry product having the fluid properties most desirable for ready pumpability and spraying. If the refluidizing is to be carried out by raising the pH by adding ammonia the additional nitrogen which will be added during ammoniation to refluidize the gelled fertilizer may be taken into account in calculating the formulation to be used in making the fertilizer.

While the particular example given at the end of this specification produces a slurry fertilizer which has a colloidal susceptible range of about 6.5 to 7.5, the colloidal susceptible range will vary with other formulations and procedures. It is believed that some slurry fertilizers may have more than one colloidal susceptible range. It has been observed that gelled fertilizers may be refluidized by either raising the pH above the colloidal susceptible range or lowering the pH below the colloidal susceptible range. Generally, it is believed that a pH of 8–9 is above the colloidal susceptible pH range of all slurry fertilizers. Once a slurry fertilizer has gelled it may be necessary to raise the pH somewhat beyond the upper limit of the colloidal susceptible range before the fertilizer will refluidize.

In order to maintain the slurry fertilizer uniformly mixed it has been necessary to continuously agitate the slurry while it goes to a gel. It may be that in certain instances a slurry at its colloidal susceptible pH range could be satisfactorily gelled without the continuous turbulence brought about by stirring. The effect of stirring upon the mechanism that causes the colloidal gelling of the slurry is not known, if there is such an effect. The fact that the gelation seems to be encouraged by stirring or agitation is also surprising because in the past agitation had been used to prevent the slurries from gelling. The degree of agitation may be an important factor. Moderate agitation on an intermittent basis in field storage tanks appears to induce gelling. The same degree of agitation coupled with pump recirculation of a tank's contents and the simultaneous use of air sparging appears to retard gelling. In the laboratory vigorous high sheer agitation has been used to temporarily refluidize gelled slurries.

The fact that the slurry fertilizers can be made to perform in the desired manner has been illustrated by experimentation, and in particular, this may be found in the example portion of this specification. However, the mechanism by which this observed phenomenon occurs is not known; only the process by which it can be reproduced is known. It is theorized that perhaps the colloidal gellation and the refluidizing has some relationship to the solubility of the materials in the fertilizer at particular pH values.

It may be seen from the above discussion that, by gelling and refluidizing slurry fertilizers, an excellent method of storing and handling the fertilizers has been developed. A slurry fertilizer having a colloidal susceptible pH range may be processed directly to the colloidal susceptible range during its constitution or adjusted to the susceptible range after it has been transferred from its formulation phase to a storage facility as a free flowing liquid. Then the colloidal gelling of the fertilizer should be brought about while the fertilizer is agitated to keep it thoroughly mixed. The colloidal gel state maintains the fertilizer in a relatively static condition. When the fertilizer is needed it may be refluidized so that it can be easily pumped out of the tank as a free-flowing fluid for transfer to applicator equipment. The slurry fertilizer should be so constituted that it will have optimal slurry fertilizer qualities when it is refluidized after storage.

By the above discussed procedures an intermediate slurry fertilizer product is provided that is a very viscous colloidal gel having the characteristic of being relatively stable and static over a prolonged period of time while in storage. This product has the additional characteristic of being easily refluidized for convenient subsequent handling. The product may also be regelled by adjusting the pH back to a colloidal susceptible range. The gel has a density of about 1.3 to 1.6, between 0 and 80° F. The gel is non-free flowing and sufficiently viscous to prevent the settling of siliceous particles larger than those that would pass a U.S. Standard 100 mesh screen when the gel stands in quiescent storage for a period of one month. The water content of the gel could be from about 10 to 50%, but it is usually between about 24 to 38%. The gelled slurry has the consistency of a plastic mortar; i.e., it will retain a peaked form for a time with a gradual plastic flow to a smooth surface. The gelled slurry may be readily probed with appropriate sparging devices used for introduction of ammonia.

The invention is further illustrated by the following example which is illustrative only and does not limit the scope of the invention.

FORMULATION—6,000-GRAM BATCH OF 6-12-12

| Ingredients | Grade | Grams |
| --- | --- | --- |
| Material: | | |
| Water (added at start) | | 814 |
| Nitric Acid | 55–57% | 1,108 |
| Phosphoric Acid | 54–55% | 889 |
| Phosphate Rock | 75 BPL | 882 |
| Sodium salt of sulfonated oleic acid, defoamer. | 1:3 dilution | 4 |
| Ammonia | 82% | 305 |
| Muriate of Potash | 60–62% | 1,200 |
| 800 grams of additional water was added during ammoniation and additional water was added at the end of the process to adjust final batch weight to a total of | | 6,000 |

The reactor was a glass vesel with s.s. internals. It had a total capacity of 2½ gallons and an operating capacity of 1½ gallons. The reactor was 10 inches high with a 4 3/16-inch radius. It was covered at the top, equipped with an agitator, and had solids and acids inlets through the top and an inlet for anhydrous ammonia extending through the top and down the side and discharging under the propeller of the stirrer or agitator. A 1½-inch thick magnesia shield encompassed the reactor to insulate it and aid in retention of the heat of reaction.

The following procedure was carried out. The 814 grams of water was added to the reactor and the agitator was turned on. Next all of the acids were added to the reactor. This was followed by the addition of the phosphate rock at a substantially even rate over a 7 minute period. The defoamer was added with the phosphate rock as needed to control foaming. The reaction mixture was held for 10 minutes after the completion of the rock addition to allow for a more complete acidulation. Ammoniation was then begun at the rate of 9 grams per minute. This rate was maintained for 10 minutes and then the rate was dropped to 6 grams per minute for the next 10 minutes. After this, 800 grams of water was added and the ammoniation rate was increased to 9 grams per minute for 15 minutes. The addition of ammonia was then stopped and all of the KCl was added. Additional water was then added to bring the batch weight to 6,000 grams. In this regard it is noted that some of the original water was lost due to boil off caused by the heat of reaction. Ammoniation was then begun again and continued at 6 grams per minute with interruptions to take a 100 ml. sample at each of the pH levels indicated in the following table, Table I.

These samples were subjected to a laboratory shaking test to evaluate changes in physical properties of the slurry under agitated conditions. Each sample was placed in a 300 ml. Erlenmeyer flask and stoppered to prevent evaporation loss. The flasks were then attached to the arm of a Burrell Wrist action shaker operating at a stroke rate of a 250 cycles/per minute and having an amplitude of ¾ inch in an environment maintained at 75–80° F. The flask contents were evaluated at 4-hour intervals for the degree of fluidity on a visual basis. The results obtained are listed in Table I.

TABLE I.—PHYSICAL PROPERTIES OF SLURRY IN SHAKER TEST

| Sample pH | Time and Condition |
|---|---|
| 5.9 | 287 hours—very fluid. |
| 6.2 | Do. |
| 6.5 | Viscous but flowable at 41 hours—retained this condition to completion of test. |
| 6.75 | 98 hours—gelled—nonflowable. |
| 7.00 | 68 hours—gelled—nonflowable. |
| 7.40 | 98 hours—gelled—nonflowable. |
| 7.80 | 287 hours—very fluid. |
| 8.00 | Do. |

Analysis (at pH 8.0).—N, 6.99%; TPA, 12.96%; CJ, 0.60%; APA, 12.36%; WSPA, 4.92%; $K_2O$, 12.32%; $H_2O$, 44.00%.

While in accordance with the patent statutes, we have described what at present is considered to be the preferred embodiment of this invention, it will be obvious to those skilled in the art that various changes and modifications may be made therein without departing from the present invention, and we, therefore, aim in the following claims to cover all such equivalent variations as fall within the true spirit and scope of this invention.

We claim:
1. A method for preparing a slurry fertilizer which may be stored in a substantially static state for a prolonged period of time as a colloidal gel and then refluidized at the end of the said storage, said method comprising the steps of: acidulating phosphate rock to a citrate soluble phosphate level of at least 85 percent, ammoniating said acidulate from a pH below 1 to a pH within the colloidal susceptible range, transferring the resulting slurry to a storage container, continuously stirring said slurry until gelation to form a stiff colloidal gel that prevents precipitation of the suspended materials in said slurry, and refluidizing said gelled mass by raising the pH in the range of about pH 8 to 9 or by lowering the pH in the range of about pH 5.9 to 6.2.

2. The method according to claim 1 wherein the colloidal susceptible range is within the pH of about 6.5 to 7.5 and wherein said gelled mass is refluidized by introducing anhydrous ammonia into the said mass until the said mass obtains a pH between 8 and 9 to restore said slurry to a liquid slurry consistency.

3. The method according to claim 1 wherein the gelled mass is refluidized by raising the pH of the mass from the colloidal susceptible pH range of about 6.5 to 7.5 to the non-colloidal susceptible pH range of about 8 to 9.

4. A method for preparing a slurry fertilizer which may be stored in a substantially static state for a prolonged period of time as a colloidal gel and then refluidized at the end of the said storage period, said method comprising the steps of: acidulating phosphate rock with an acid selected from the group consisting of nitric, phosphoric and sulfuric acid and mixtures thereof, ammoniating said acidulate to a colloidal susceptible pH range between 6.5 and 7.5, agitating said slurry to gelation to form a stiff colloidal gel that prevents precipitation of the suspended materials in said slurry and refluidizing said gel by introducing anhydrous ammonia into said gel and raising the pH in the range of about 8 and 9.

5. A method of refluidizing a slurry fertilizer that has set up into a colloidal gel comprising changing the pH of the gelled fertilizer from the colloidal susceptible range to a pH between about 8 and 9, thereby refluidizing said fertilizer.

6. The method according to claim 1 wherein the colloidal susceptible range is within the pH range of about 6.5 to 7.5.

References Cited

UNITED STATES PATENTS

| 3,041,160 | 6/1962 | Makower et al. | 71—43 |
| 3,148,970 | 9/1964 | Smith et al. | 71—62 |
| 3,179,496 | 4/1965 | Skinner et al. | 71—43 |

DONALL H. SYLVESTER, Primary Examiner.

T. G. FERRIS, Assistant Examiner.

U.S. Cl. X.R.

71—43